United States Patent
Sliwkowski et al.

[15] 3,704,657
[45] Dec. 5, 1972

[54] ADAPTIVE OPTICAL FOCUSING SYSTEM

[72] Inventors: Joseph J. Sliwkowski, Framingham; Gilbert Fryklund, Winchester, both of Mass.

[73] Assignee: Computervision Corporation, Burlington, Mass.

[22] Filed: May 5, 1971

[21] Appl. No.: 140,348

[52] U.S. Cl..........................95/44 R, 355/53, 355/56
[51] Int. Cl............................................G03b 3/00
[58] Field of Search..........95/44; 355/46, 53, 54, 55, 355/56

[56] References Cited

UNITED STATES PATENTS

| | | | |
|---|---|---|---|
| 3,326,081 | 6/1967 | White | 355/56 X |
| 3,103,850 | 9/1963 | Khoury et al. | 355/56 X |
| 3,260,153 | 7/1966 | Abbott, Jr. et al. | 355/73 X |

*Primary Examiner*—Samuel S. Matthews
*Assistant Examiner*—Richard A. Wintercorn
*Attorney*—Chittick, Pfund, Birch, Samuels & Gauthier

[57] ABSTRACT

An adaptive optical focusing system which utilizes two relatively movable lenses and a servo gauging system to maintain one of the lenses at a fixed distance from a photosensitive medium. An illuminated object or light aperture is located at the focal point of the first lens. The second movable lens is positioned to intercept the collimated light rays from the first lens and to focus the image of the light aperture on the photosensitive medium. A servo gauging system maintains the second lens at a distance from the photosensitive medium which corresponds to the focal length of the second lens.

4 Claims, 3 Drawing Figures

PATENTED DEC 5 1972  3,704,657
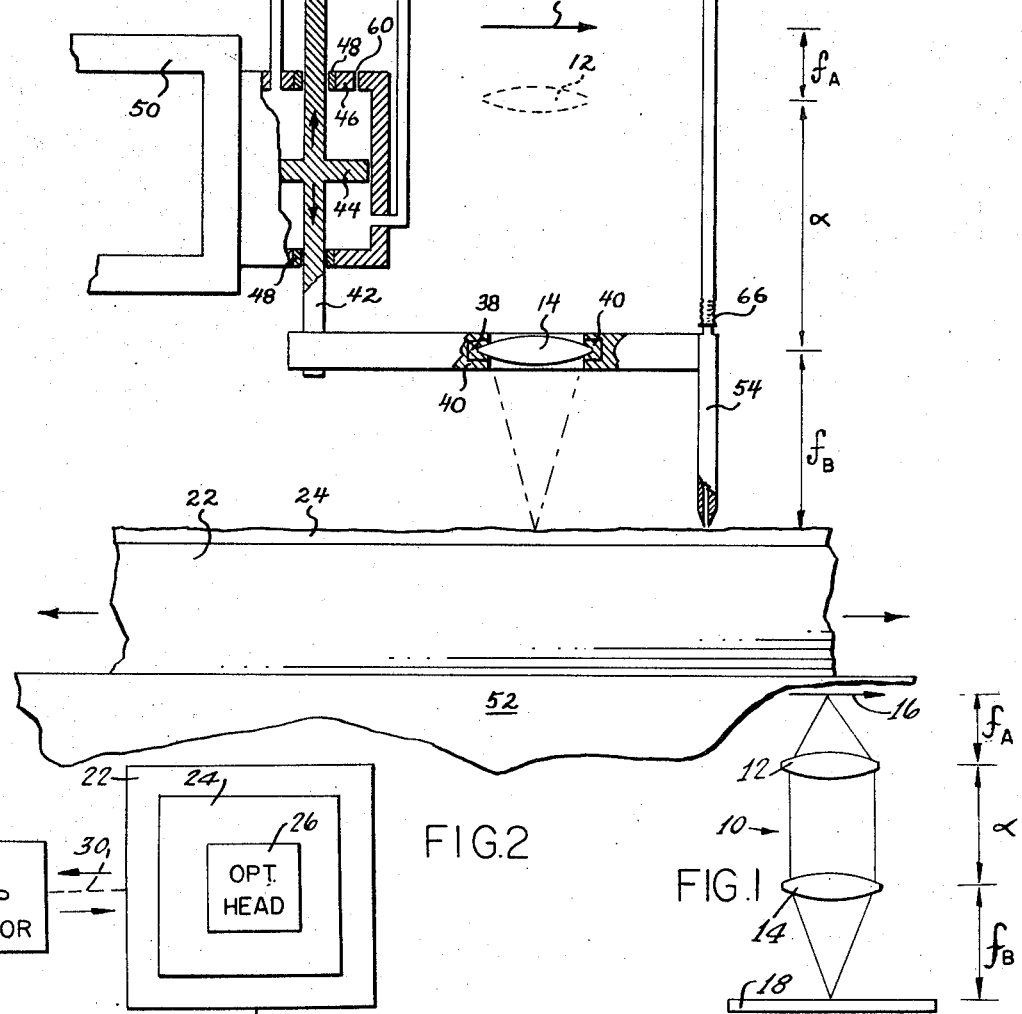

ADAPTIVE OPTICAL FOCUSING SYSTEM

BACKGROUND OF THE INVENTION

This invention relates to optical systems in general and, more particularly, to an adaptive optical focusing system.

Photographic machines, such as, photocomposers and photoplotters are being used at the present time to generate accurate and highly detailed images of art work, letters, and other indicia through photographic processes. In the electronic field, computer controlled, digitally driven photoplotters are employed to generate printed circuit board negatives. Very tight mechanical and optical tolerances are required in these types of machines in order to achieve accurate positioning and focus of the images upon the photosensitive medium.

It is accordingly a general object of the invention to provide an optical system for photoplotters and other photographic machines which has a depth of focus that is much smaller than the mechanical tolerances of the other machine components and of the photosensitive medium itself.

It is a specific object of the present invention to provide an adaptive focusing optical system for photographic machines.

It is a feature of the present invention that the adaptive focusing optical system can be used to compensate for variations in the thickness of photoplotter emulsion sensitized glass plates.

It is another feature of the invention that the adaptive focusing optical system provides a continuous and accurate focusing of the projected image upon a photosensitive medium without mechanically contacting the medium.

SUMMARY OF THE INVENTION

The adaptive focusing optical system of the present invention employs a two lens system in which the second or final objective lens is movable with respect to the first lens. A light illuminated object or light aperture is positioned at the focal point of the first lens. The second lens is positioned to intercept the collimated light rays from the first lens. The second lens is maintained at a fixed distance away from the photosensitive medium by a non-contact gauging servo system. The servo system automatically maintains the second lens-photosensitive medium spacing so that the surface of the photosensitive medium will remain at the focal point of the second lens despite any variations in thickness or flatness of the photosensitive surface.

DETAILED DESCRIPTION OF THE INVENTION

The objects and features of the present invention will best be understood from a detailed description of a preferred embodiment thereof, selected for purposes of illustration and shown in the accompanying drawings, in which:

FIG. 1 is a diagrammatic view showing the relationship of the two lens adaptive focusing system and the photosensitive medium;

FIG. 2 is a diagrammatic view in partial block form showing a typical photoplotting machine; and, FIG. 3 is another diagrammatic view in partial section and block form illustrating the adaptive optical focusing system and a non-contact gauging, pneumatic servo.

Turning now to the drawings, FIG. 1 illustrates the basis concepts of the adaptive optical focusing system of the present invention which is depicted therein in diagrammatic form and indicated generally by the reference numeral 10. The adaptive optical focusing system 10 comprises two relatively movable, light converging lenses 12 and 14. For purposes of illustration, the lenses are depicted as single element positive lenses. However, it should be understood that a multiple element lens system can be used for each of the lenses 12 and 14. An object 16, such as, a light aperture or negative containing the information to be imaged upon a photosensitive medium 18 is located at the focal point of lens 12. The spacing between lens 12 and the object or light aperture 16 is fixed and equals the focal length $f_A$ of lens 12. The second lens or final objective 14 of the optical system is positioned to intercept the collimated light rays from lens 12. Lens 14 in turn focuses on image of the light aperture or object 16 upon the surface of the photosensitive medium 18.

If the surface of the photosensitive medium 18 is located at the focal point of lens 14 and the spacing between the optical center of lens 14 and the surface of the photosensitive medium is maintained at a distance corresponding to the focal length of $f_B$ of lens 14, then the spacing between lenses 12 and 14 can be varied over a wide range without appreciably affecting the image quality. Thus, if lens 12 is fixed and lens 14 is movable, any variations in the height of the photosensitive medium can be automatically compensated for as long as the distance from the film surface to lens 14 is kept at the focal length $f_B$ of lens 14. The instrumentation for maintaining the focal length separation between lens 14 and the photosensitive medium will be discussed below in connection with FIG. 3.

FIG. 2 illustrates in diagrammatic form a photoplotter indicated generally by the reference numeral 20. The photoplotter 20 comprises a movable photoplotting surface or table 22 upon which is located a photosensitive medium or film 24. Positioned above the plotting table 22 is an optical head 26 containing a light source and a light aperture (neither of which is shown). The "light aperture" can be a physical aperture or a medium, such as, a film transparency which will permit light to pass through the medium in a selected pattern. For purposes of this application, the term "light aperture" will be used to designate an information bearing optical pattern positioned at the focal point of the lens 12 and shown as the conventional optical arrow 16 in the diagrammatic view of FIG. 1.

Relative motion between the plotting table-film combination 22 and 24, respectively, and the optical head 26 can be achieved by moving the film-plotting table combination, the optical head and/or both. For purposes of illustration, the photoplotter 20 shown in FIG. 2 utilizes a fixed optical head with translational movement of the plotting table 22 and film 24. Incremental movement of the plotting table and film along the X axis is provided by a digitally driven X-stepping motor 28 which is mechanically connected to the plotting table through appropriate gearing indicated representationally in FIG. 2 by the dashed lines 30. Similarly, incremental movement along the Y axis is provided by X stepping motor 32 through gearing 34. Actuation of the stepping motors 28 and 32 is under the control of a command circuit 36 which includes the necessary program information from a conventional source such as a computer or punched tape(not shown).

Referring now to the FIG. 3, there is shown in diagrammatic view and in partial section and block form the the adaptive focusing system of the present invention together with the associated instrumentation for maintaining the spacing between the optical center of the final objective lens 14 and the surface of the photosensitive medium or film 24 at a distance equal to the focal length $f_B$ of lens 14. Lens 14 is held by means of mounting members 38 in a rigid frame 40. The frame 40 is in turn secured to shaft 42 of a piston 44. The piston 44 is positioned within a cylinder 46 and is free to slide along the axis of the cylinder. Bushing 48 are used to support the piston shaft 42.

The piston cylinder 46 is mounted by means of brackets 50 to a frame member(not shown) which in turn is securely fastened to the base 52 of the photoplotter. Thus, looking at FIG. 3, it can be seen that the cylinder 46 is located at a fixed distance above the base 52 of the photoplotter and, therefore, a fixed distance above the movable plotting table 22 and film 24. On the other hand, the piston 44 and lens mounting bracket 40 are movable with respect to the plotting machine base 52. Thus, by correctly positioning the piston 44, the final objective lens 14 can be located at the desired distance i.e., focal length $f_B$, above the surface of the photosensitive film 24.

In the preferred embodiment of the invention, a non-contact gauging system is used to generate the positional information for maintaining the correct spacing between the lens 14 and the surface of the photosensitive medium. One such non-contacting gauging system that can be employed in the present invention is the AG-700 non-contact type follower gauge sold by the B.C. Ames Company, Waltham, Massachusetts 02154. In the AG-700 non-contact gauging system a pneumatic sensor probe 54 is used to generate a signal which represents the distance of the sensor above the sensed surface. As shown in FIG. 3, the sensor or pneumatic probe 54 is secured with respect to and movable with the lens mounting bracket 40.

Operating pressure for the AG-700 non-contact pneumatic gauge is obtained from a pressure source 56 which supplies pressure through line 58 to the upper portion of cylinder 46. A small bleed hole 60 is provided in the upper portion of cylinder 46 so that the pressure exerted upon the upper face of piston 44 will be slightly less than the outlet pressure from pressure source 56. Typically, in the AG-700 system the pressure source supplies a pressure of 20 pounds per square inch. The operating pressure for the gauging probe 54 is reduced by regulator 62 to a nominal 6 pounds per square inch. The 6 pounds per square inch pressure line 64 is connected to the probe 54 through a flexible coupling 66 and to a spring-loaded bellows 68 through pressure line 70. The spring-loaded bellows 68 has a nominal loading of approximately 5.8 pounds per square inch.

Positioned above the bellows 68 as shown in FIG. 3, is a sensor mechanism indicated generally by the reference numeral 72. The sensor mechanism has an upper chamber 74 that is connected to the pressure source 56 through line 76. An outlet orifice pipe 78 is connected to the pressure chamber 74 with the outlet orifice slightly above the plate 68a of the spring-loaded bellows assembly. Another pressure chamber 80 is positioned concentrically around the outlet orifice pipe 78 with an orifice 82 located between the orifice of pipe 78 and the bellows plate 68a. The second pressure chamber 80 is connected by pressure lines 84 to the lower portion of the piston cylinder 46.

With the system's pressure applied by pressure source 56, the pneumatic sensor probe 54 will discharge a volume of air that is related to the distance between the outlet of probe 54 and the surface of film 24. The feedback pressure to bellows assembly 68 is monotonically and inversely related to the distance from the surface of film 24 to the outlet of sensor probe 54. Therefore, as the distance between the probe outlet and the film decreases, the feedback pressure will increase causing the bellows plate 68a to move upwardly, as viewed in FIG. 3, toward the outlet orifice 82. As the distance between bellows plate 68a and the outlet orifice 82 decreases, the pressure on line 84 increases thereby causing the piston 44 to move in an upwardly direction. Since the lens 14, lens bracket 40 and probe 54 are mechanically connected to the piston 44, they too will also move in an upwardly direction. When the balanced condition is reached, the pneumatic servo will thereafter maintain the distance between the optical center of lens 14 and the film surface at a fixed distance. By selecting the appropriate servo parameters, the distance can be made the same as the focal length of lens 14.

Although the preceding description has been directed to a commercially available non-contact gauging, pneumatic servo system (B.C. Ames,Co., AG-700) other systems can be employed to obtain the necessary distance feedback signal for adjusting the position of lens 14 to compensate for variations in the thickness of the photosensitive medium 24. For example, optical equipment can be used to obtain the desired feedback distance signal. One such instrument is the Ranging Optical Probe sold by the Itek-Kingsbury Company 59 Davis Avenue, Norwood, Massachusetts 02062. Other instrumentation can also be employed including contact gauging by conventional means. However, in the preferred embodiment it is desirable to employ a non-contact gauging means in order to avoid scratching the relatively fragile photographic emulsion of film 24.

Having described a commercially available non-contact, pneumatic gauging servo system and having mentioned an available non-contact, optical gauging system as well as the standard and well-known contact gauging systems, it will be appreciated that the adaptive focusing optical system of the present invention can be generalized to include instrumentation for maintaining the final objective lens 14 of the optical system at a fixed distance from the surface of the photosensitive medium which equals the focal length of the lens. This distance represents a reference point in the servo system and can be expressed in a variety of ways depending upon the type of feedback "signal" used in the sensing system. For example, the reference point can comprise a pneumatic pressure level as in the case of the system shown in FIG. 3, or an electrical parameter such as a voltage level or a frequency. Therefore, for purposes of this application, the term "signal" should be construed to include information in pneumatic or electrical form. Similarly, the term "reference point" should be construed to mean a corresponding parameter in the "signal" system. For example, if the "signal" is pneumatic, then the "reference point" can be a pressure level, while in the case of an electrical signal, it will be an electrical parameter such as, a voltage level or a frequency.

Having described in detail a preferred embodiment of my invention, it will now be apparent to those skilled in the art that numerous modifications can be made thereto without departing from the scope of the invention as defined in the appended claims.

What we desire to claim and secure by Letters Patent of the United States is:

1. In a photoplotter having a light source and a light aperture, an adaptive focusing optical system for imaging the light aperture on a photosensitive medium, said adaptive focusing system comprising:
   1. a first light converging lens means positioned away from said light aperture at a distance equal to the focal length of said lens means so that the light aperture is at the focal point thereof;
   2. a movable second light converging lens means positioned to intercept the collimated light rays from said first light converging lens means, said second light converging lens means focusing the image of said light aperture on the photosensitive medium; and,
   3. means for maintaining said second light converging lens means at a distance from said photosensitive medium which equals the focal length of said second lens means.

2. The adaptive focusing optical system of claim 1 wherein said distance maintaining means includes:
   1. gauging means secured with respect to and movable with said second light converging lens means, said gauging means producing a gauging signal having a characteristic which represents the distance between said gauging means and said photosensitive medium;
   2. means responsive to said gauging signal for producing a correction signal whenever said gauging signal departs from a reference point; and,
   3. means responsive to said correction signal for moving said second light converging lens means and said gauging means until said gauging signal returns to said reference point.

3. The adaptive focusing system of claim 2 wherein said gauging means comprises a non-contact pneumatic gauge.

4. The adaptive focusing system of claim 2 wherein said gauging means comprises a non-contact light gauge.

* * * * *